(12) United States Patent
Zhou et al.

(10) Patent No.: US 8,165,443 B2
(45) Date of Patent: Apr. 24, 2012

(54) COMMUNICATION SOCKET

(75) Inventors: Junsheng Zhou, Shanghai (CN); Pierre Bonvallat, Cluses (FR); Zhiyong Xu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 392 days.

(21) Appl. No.: 12/594,355

(22) PCT Filed: Mar. 26, 2008

(86) PCT No.: PCT/US2008/058184
§ 371 (c)(1),
(2), (4) Date: Oct. 2, 2009

(87) PCT Pub. No.: WO2008/124293
PCT Pub. Date: Oct. 16, 2008

(65) Prior Publication Data
US 2010/0142899 A1    Jun. 10, 2010

(30) Foreign Application Priority Data
Apr. 9, 2007   (CN) .......................... 2007 1 0096884

(51) Int. Cl.
*G02B 6/44* (2006.01)
(52) U.S. Cl. ..................................................... 385/135
(58) Field of Classification Search .................. None
See application file for complete search history.

(56) References Cited

U.S. PATENT DOCUMENTS

| | | | |
|---|---|---|---|
| 4,976,510 A | 12/1990 | Davila et al. | |
| 6,315,598 B1 * | 11/2001 | Elliot et al. | ................... 439/456 |
| 6,379,166 B1 | 4/2002 | Hagarty et al. | |
| 6,435,727 B1 | 8/2002 | Fingler et al. | |
| 6,543,940 B2 | 4/2003 | Chu | |
| 7,406,241 B1 | 7/2008 | Opaluch et al. | |
| 2004/0013389 A1 | 1/2004 | Taylor | |

FOREIGN PATENT DOCUMENTS

| | | |
|---|---|---|
| JP | 63-141008 | 6/1988 |
| JP | 2005-164994 | 6/2005 |
| KR | 20-0399079 Y1 | 10/2005 |
| KR | 20-0417161 Y1 | 5/2006 |
| KR | 10-2006-078009 A | 7/2006 |
| KR | 10-0645503 B1 | 11/2006 |
| TW | 256407 | 9/1995 |
| TW | M246334 | 10/2004 |
| WO | 97/44872 | 11/1997 |

* cited by examiner

*Primary Examiner* — Jerry Rahll
(74) *Attorney, Agent, or Firm* — Janet A. Kling

(57) ABSTRACT

A communication socket comprises a housing including a base portion having a bottom wall and a plurality of sidewalls and a cover portion. The base portion and the cover portion are detachably engaged with each other. The base portion includes a plurality of knock-off holes for inserting an optical fiber at different positions in the sidewall and/or a plurality of fiber entries for inserting a fiber through the bottom wall. The fiber-connector-mounting portion extends from the base. Each of the fiber-connector-mounting portion includes a spacer for maintaining a fiber connector at a distance away from the bottom wall, and a space for inserting the fiber between the fiber connector and the bottom wall. The volume of the communication socket can be minimized, the integration thereof can be improved, the fiber can enter the communication socket in all directions while the fiber's bend radius is satisfied, and the management on the fiber and cable in the communication socket is effective.

15 Claims, 4 Drawing Sheets

COMMUNICATION SOCKET

This application is a national stage filing under 35 U.S.C. 371 of PCT/US2008/058184, filed Mar. 26, 2008, which claims priority to Chinese Patent Application No. 200710096884.5, filed Apr. 9, 2007, the disclosure of which is incorporated by reference in its entirety herein.

TECHNICAL FIELD

The present invention relates to a communication socket for connection in an optical network.

BACKGROUND OF THE INVENTION

In fiber to the home (FTTH) and fiber to the desk (FTTD) communication networks, the communication socket is often used as a terminal connecting device for fiber and cable. At present, there are many kinds of communication sockets for mounting on a wall and for accommodating optical fiber connectors which made up of fiber connector plug and corresponding socket and electrical connectors to provide a communication interface and protect the connectors and connections. The communication socket is favored due to the ease of installation and the flexibility of connection.

However, conventional communication sockets have a larger size, they shall be independently mounted or engage with a special base box on the wall, they cannot match with a common standard base box.

Additional deficiencies in the conventional communication sockets are as follows:

1. Access to current communication sockets is limited, that is, conventional communication sockets do not allow fibers to be connected in all directions.
2. With respect to the protection for the fiber and cable, the fiber's bend radius can not be satisfied.
3. Shapes and directions of fiber and copper cable entering communication sockets are limited.
4. Existing communication sockets do not provide adequate fiber management. The fiber path is disordered, which may result in damage to the fiber.

There are some inventions having been developed to solve the above problems. For example, both of U.S. Pat. No. 4,976,510 (Nov. 11, 1990) and PCT Application WO1997044872 (1997.1.27) have disclosed a communication socket, which accommodates a plurality of optical fiber connectors and electrical connectors and stores the fibers and cable. However, the sizes of these communication sockets are large, which is not able to match with international wall mount boxes and sockets like for example 86×86 mm defined by British Standards and there is no all-direction connection means.

SUMMARY OF THE INVENTION

Therefore, one object of the present invention is to provide a communication socket, in which the volume thereof is reduced while the fiber's bend radius is satisfied, and the integration of the communication socket is improved, the fiber and cable can enter into the communication socket in all directions.

Further, another object of the present invention is to provide a communication socket, in which the arrangement of fiber and cable is regulated and the damage on the fiber and cable is avoided.

According to one aspect of the present invention, communication socket comprises a housing including a base portion having a bottom wall and a plurality of sidewalls and a cover portion. The base portion and the cover portion are detachably engaged with each other. The base portion includes a plurality of knock-off holes for inserting an optical fiber at different positions in the sidewall and/or a plurality of fiber entries for inserting a fiber through the bottom wall. The fiber-connector-mounting portion extends from the base. Each of the fiber-connector-mounting portion includes a spacer for maintaining a fiber connector at a distance away from the bottom wall, and a space for inserting the fiber between the fiber connector and the bottom wall.

Further, according to another aspect of the present invention, mounting height of the fiber-connector-mounting portion in a vertical direction perpendicular to the bottom wall is larger or equal to twice the height of the fiber connector. The fiber socket mounting portion including two fiber connectors.

Further, according to another aspect of the present invention, the communication socket comprises at least one bracket extending from the bottom wall. The bracket includes at least two fiber holders at the different heights with respect to the bottom wall. Preferably, at least one bracket extends from the bottom wall integrally.

Further, according to another aspect of the present invention, the position of the knock-off holes corresponding with the space between the fiber connector and the bottom wall.

According to another aspect of the present invention, the communication socket comprises a electrical socket mounting portion, and the communication socket comprises at least one cable entry in the center of the bottom wall and/or at least one knock-off hole in the sidewall for inserting an electrical cable into the communication socket. The electrical connector mounting portion includes an electrical connector. Further, the communication socket comprises a spacer for maintaining the cable connector at a distance away from the bottom wall.

According to another aspect of the present invention, a plurality of parallel annular wall portions extends from the bottom wall, wherein the annular wall portions define an annular channel between the wall portions. The communication socket comprises slots for containing the fiber are provided on the bottom wall at the positions close to the knock-off holes, wherein a plurality of securing ribs are provided on sides of the slots.

According to another aspect of the present invention, the communication socket comprises a fiber adapter disposed in the slot for containing the fiber.

Preferably, the communication socket further comprises a plurality of fiber entries in the bottom wall, which are inclined and curved in the direction in which the fiber is inserted. The fiber entries have securing portions for securing fiber.

Preferably, the fiber-connector-mounting portion comprises a pair of posts with grooves facing to each other.

Preferably, the fiber connector mounting portion extends from the base integrally.

According to the communication socket of the present invention, the volume thereof can be minimized, the integration thereof can be improved, the fiber can enter the communication socket in all direction while the fiber's bend radius is satisfied, and the management on the fiber and cable in the communication socket is effective.

EMBODIMENTS FOR CARRYING OUT THE INVENTION

Exemplary embodiments herein provide a duel purpose communication socket to provide a plurality of communication ports in the premise for fiber to the home (FTTH) and fiber to the desk (FTTD) communication systems. Particular advantages of the design of the present communication socket include a robust housing and the ability to accommodate and manage either fiber optic and/or electric cable connections in a smaller footprint than previously possible.

Hereafter, an embodiment according to the present invention is described.

Figure 1:
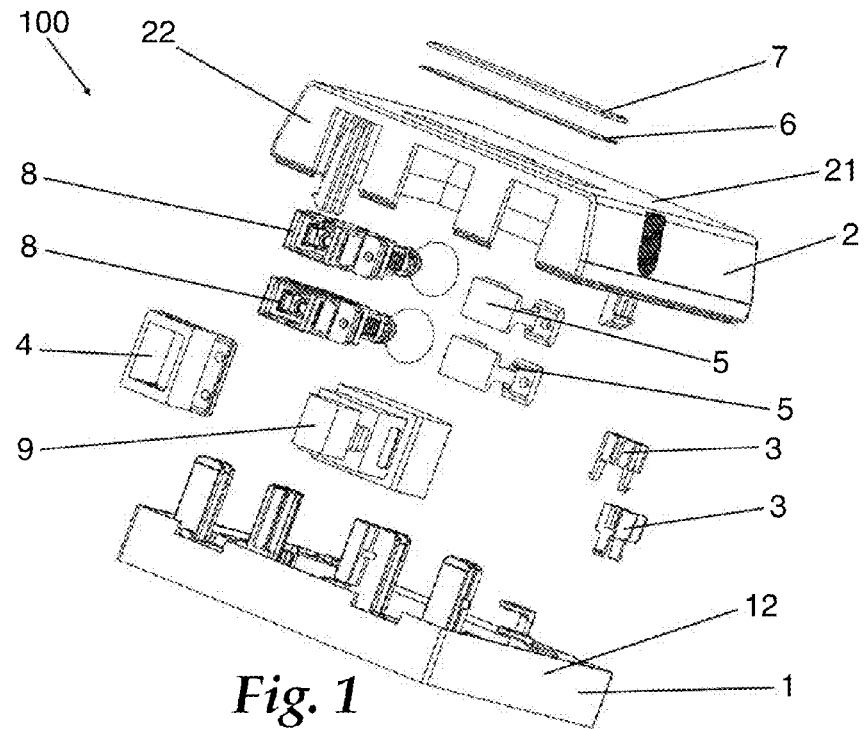
FIG. 1 is an exploded view of a communication socket according to the present invention.

FIG. 1 shows an exploded view of communication socket 100 according to the present invention. As shown in the FIG. 1, the communication socket 100 has a housing, which comprises a base portion 1 and a cover portion 2. The base portion and the cover portion are detachably engaged with each other, for example, by means of the snap-connection means. In the present embodiment, both of the base portion 1 and the cover portion 2 are square in shape, but other shapes are contemplated and should be considered to fall within the scope of the current invention. The base portion 1 has a bottom wall 11 and four sidewalls 12 which may be attached to the edges of the bottom wall and extend away from the bottom wall 11 such that the sidewalls may be substantially perpendicular to the bottom wall. The cover portion 2 has a top wall 21 and four sidewalls 22. The sidewalls 22 may be attached to the edges of the top wall 21 and extend away from the top wall. In some embodiments, the sidewalls 22 may be substantially perpendicular to the top wall 21. Alternatively, at least one of the sidewalls 22 may extend obliquely from the top wall 21. When assembled, the sidewalls 12, 22 of the base portion 1 and cover portion 2 form the sidewalls of the housing. Alternatively, the base portion 1 and the cover portion 2 may be attached by a hinge on one side of the housing and an engagement mechanism on the opposing side of the housing. The base portion 1 and the cover portion 2 could also be closed by at least one screw.

Figure 2:
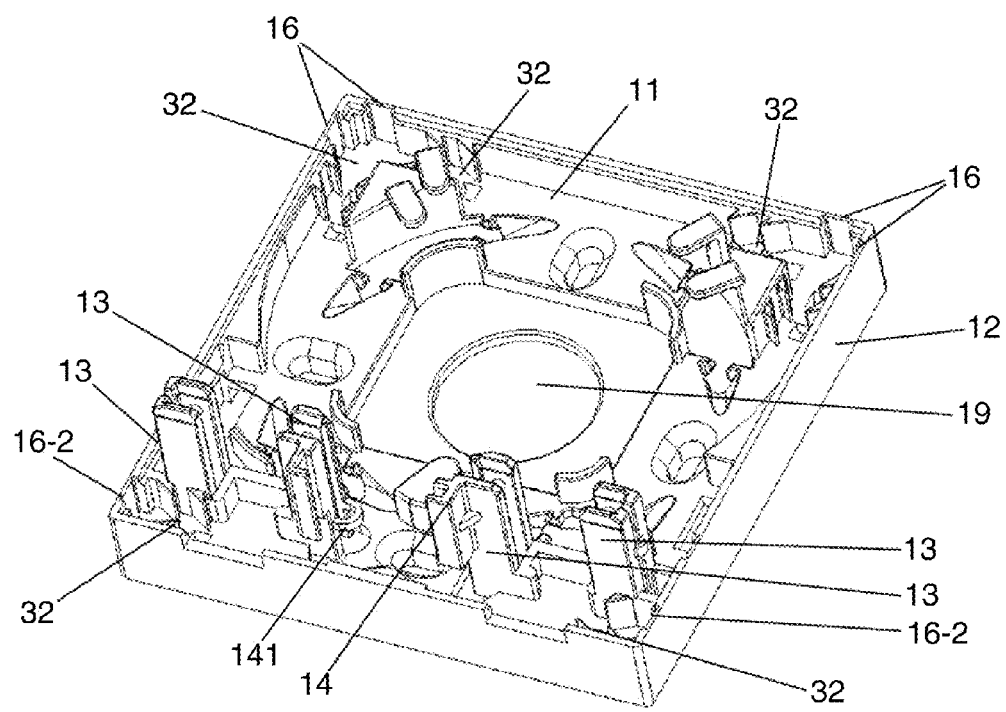
FIG. 2 is a perspective view of a base portion of the communication socket according to the present invention.

The communication socket 100 according to the present invention may be used for accommodating and fixing an optical fiber connector 8 and corresponding socket, preferably, also for accommodating and fixing electrical or copper connector 9. To this end, in the present embodiment, as shown in FIG. 2, the bottom wall 11 of the base portion 1 is extended with a fiber connector mounting portion 13 for mounting the fiber connector and corresponding socket and an electrical connector mounting portion 14 for mounting the electrical connector 9 and corresponding socket. In the embodiment, the mounting portions 13 and 14 integrally extend from the base portion 1. The number of the fiber socket mounting portion 13 and the electrical socket mounting portion 14 can be set according to the practice. In the present embodiment, each of the connector mounting portions 13 and 14 is provided with a pair of posts extending vertically from the bottom wall 11. Grooves for each pair of posts are disposed facing to each other. The connector 8 and corresponding sockets may be inserted into the grooves between the pair of posts. Of course it could be possible to have different arrangement of connectors installation and provide flexibility in having mounting portion built in rear inserted parts which could be adapted to different kinds of connectors. Further, each of the mounting portions is provided with a protrusion in ball shape for locking the fiber connectors inserted. When a socket is installed in the mounting portion, the position of the terminal of the connector corresponds to terminal holes on one of the sidewalls of the housing. In the present embodiment, the number of the terminal holes is three, one of them for electrical connector, the other two for optical fiber connectors or corresponding sockets. If the terminal holes are not occupied, the terminal holes are closed by a dummy plug 5. Alternatively, the terminal holes may be formed by removing a knock-out portion from the appropriate position in a sidewall of the housing.

Fiber connectors may be connectors such as a SC, DC, SC-DC, ST, FC, or LC connectors, to name a few, and may be, for example, either a positive contact (PC) or an angled polished connector (APC) type of connector. Sample connectors include 3M™ No Polish Connector SC Plug, 3M™ Hot Melt LC Connector, and 3M™ CRIMPLOK™ ST SM 126 UM Connector, each of which is available from 3M Company (St. Paul, Minn.).

Electrical connectors may be connectors such as a RJ-11, RJ-45 or co-ax connectors.

Figure 3:
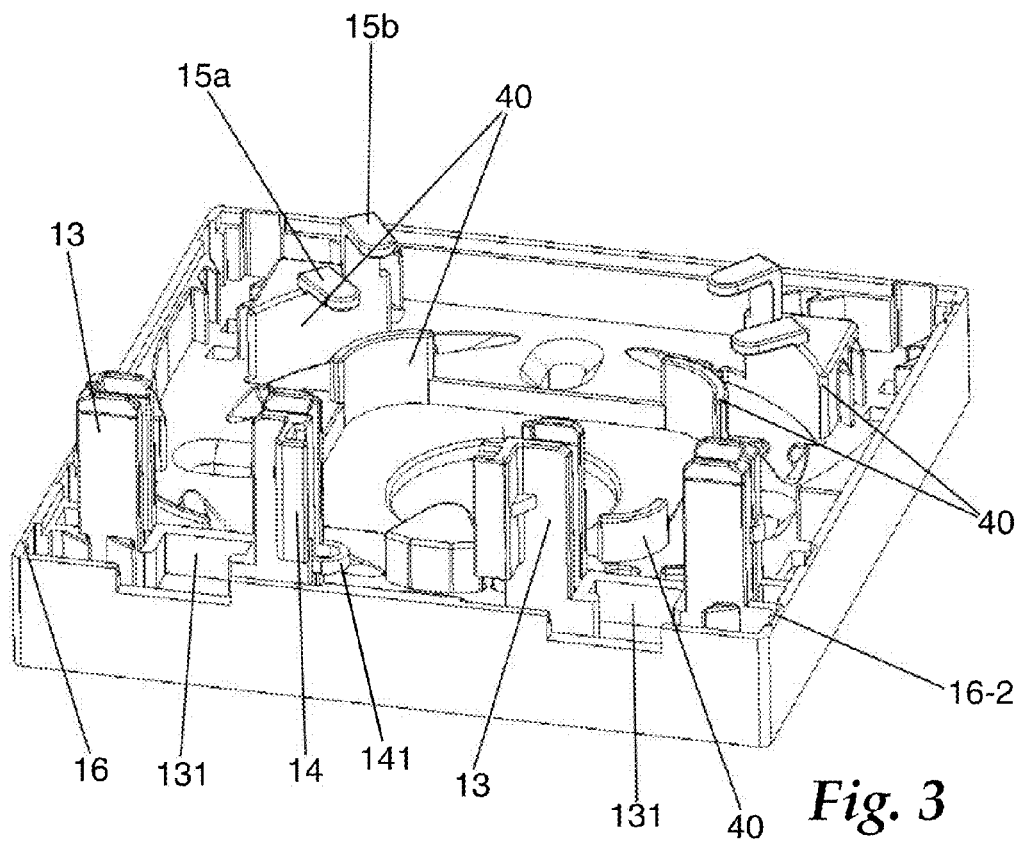
FIG. 3 is another perspective view of a base portion of the communication socket according to the present invention.

As shown in FIGS. 2 and 3, the fiber socket mounting portion 13 comprises a spacer 131. When an optical fiber connector 8 is inserted in the grooves in the posts of the fiber socket mounting portion 13, the spacer 131 keeps the connector 8 at a distance away from the bottom wall 11, so that the fiber connector 8 and the bottom wall 11 do not directly contact each other, thus, a space, which is able to accommodate a fiber cable entering from one of knock-off holes 16, 16-1 or 16-2 on the sidewall, is formed between a lower face of the optical fiber connector 8 and top internal face of the bottom wall 11 of the base portion 1. Meanwhile, for the arrangement of the fiber in the communication socket, the electrical socket mounting portion 14 is also provided with a spacer 141 for maintaining an electrical connector 9 at a distance away from the top internal face of the bottom wall 11, so that the electrical cable connector 9 and the bottom wall 11 are spaced with each other. Such spacers 131 and 141 can allow improved socket access when communication socket is installed just on the top of a skirting board (not shown) on the wall of a premise, and fiber cable running below connectors.

Figure 4:
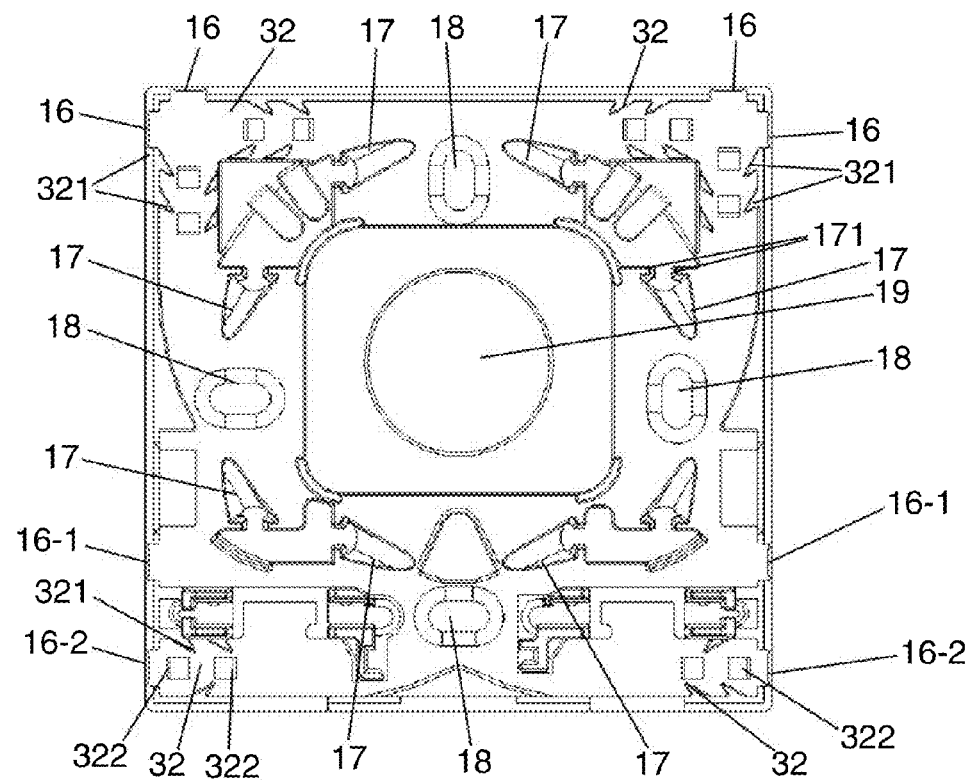
FIG. 4 is a top view of the base portion of the communication socket according to the present invention.

As shown in FIG. 4, a plurality of knock-off holes 16, 16-1 and 16-2 are formed on the sidewalls 12 of the base portion 1. The knock-off holes are thin wall portions on the sidewalls that may be easily removed without otherwise damaging the communication socket when a fiber is to be inserted. The thin wall portions, where the fiber is to be inserted, may be knocked out to form a through hole that passes through the sidewalls of the base. The position of the knock-off holes in the vertical direction perpendicular to the bottom wall 11 is lower than the position of the installed fiber connector 8, that is, the position of the knock-off hole 16 with respect to the bottom wall 11 corresponds to the space between the bottom wall 11 and the connector 8. Referring to FIG. 3, the knock-off holes 16-2 for optical fiber and electrical cable are provided closely adjacent to the bottom wall 11, and the optical fiber connector 8 is at a distance away from the bottom wall 11 by means of the spacer 131, thus, when the fiber is inserted through the knock-off holes 16-2, the fiber can pass through the space between the optical fiber connector 8 and the internal top face of the bottom wall 1. Referring to FIG. 4, preferably, the sidewalls are also provided with the knock-off holes 16-1 for inserting the cable to connect to the electrical connector 9.

Further, according to the embodiment of the present invention, the fiber connector mounting portion 13 is arranged so that at least two optical fiber connectors and corresponding sockets can be mounted thereon in the vertical direction perpendicular to the bottom wall 11, that is, the mounting height of each of the fiber-connector-mounting portions 13 in a vertical direction perpendicular to the bottom wall is larger or equal to twice times of the mounting height of the fiber connector. Thus, when two fibers are connected in the communication socket from one direction, they lead to one fiber socket mounting portion 13 in two layers, so that the size of the communication socket is reduced and the fiber's bend radius is satisfied. Further, to keep the fibers in order and avoid the fiber from being damaged, the communication socket 100 comprises a bracket 15 being integrally formed on the bottom wall 11, the bracket 15 comprises two fiber retainers 15a and 15b for maintaining the fibers in two layers at different heights with respect to the bottom wall 11, the positions of each of the fiber retainers 15a and 15b in vertical direction correspond to the position of each of the fiber connectors being mounted in the vertical direction, respectively.

Figure 7:
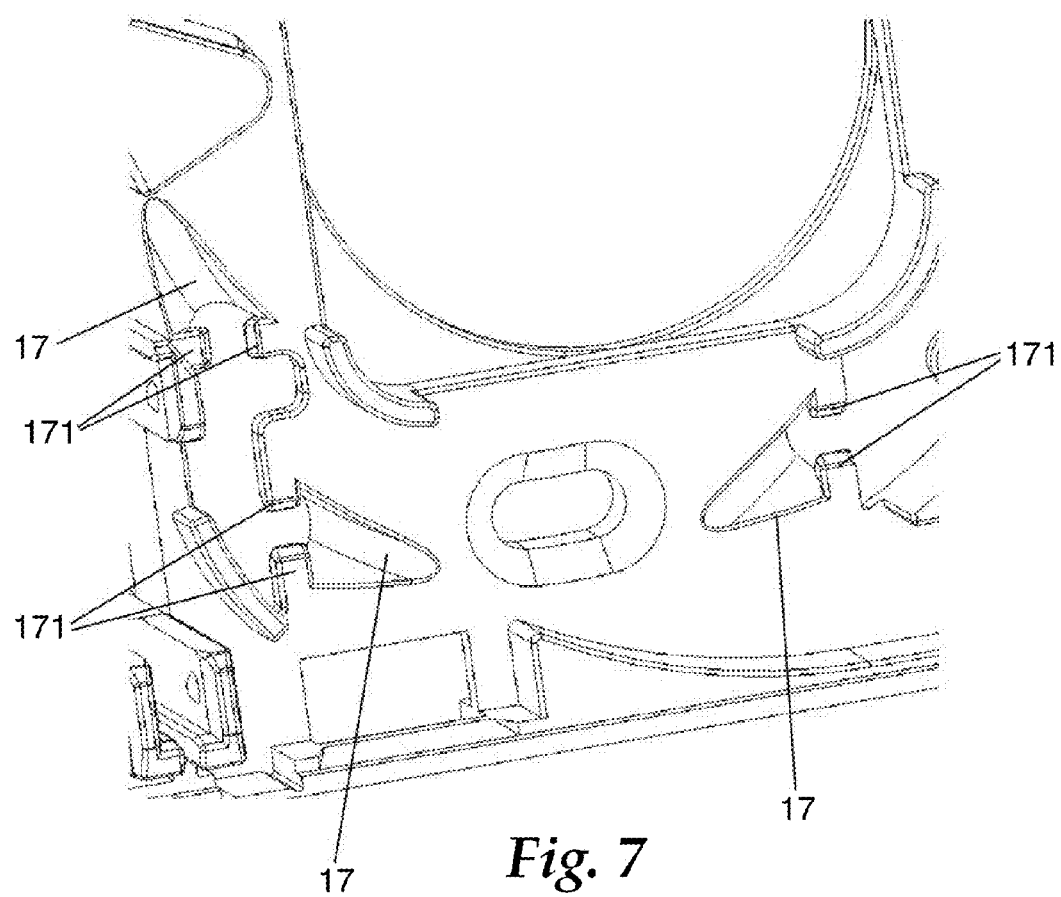
FIG. 7 shows some fiber entries on the base portion.

As shown in FIG. 4, besides the eight knock-off holes 16, 16-2 for the optical fiber on the sidewalls, the communication socket 100 further comprises eight fiber entries 17 for inserting the fiber from backside of the bottom wall 11. The plurality of the fiber entries 17 in the bottom wall may be inclined and curved in the direction in which the fiber is inserted, so that the fiber can smoothly enter into the communication socket 10 from the backside of the bottom wall 11. The configuration and position of fiber entries 17 provide that the optical fiber's bend radius is satisfied in both horizontal and vertical directions, so that the fiber can be protected from being damaged due to an excessive small bend radius. Further, securing portions for securing fiber, such as small protrusions 171 as shown in FIG. 7 for clamping either the fiber or fiber guiding tubes, are provided on the holes 17.

As shown in FIG. 2 and FIG. 4, a cable entrance or large hole 19 for cable is provided in the center of the bottom wall 11. Any kind of shape could be applied to the cable entry 19.

Figure 5:
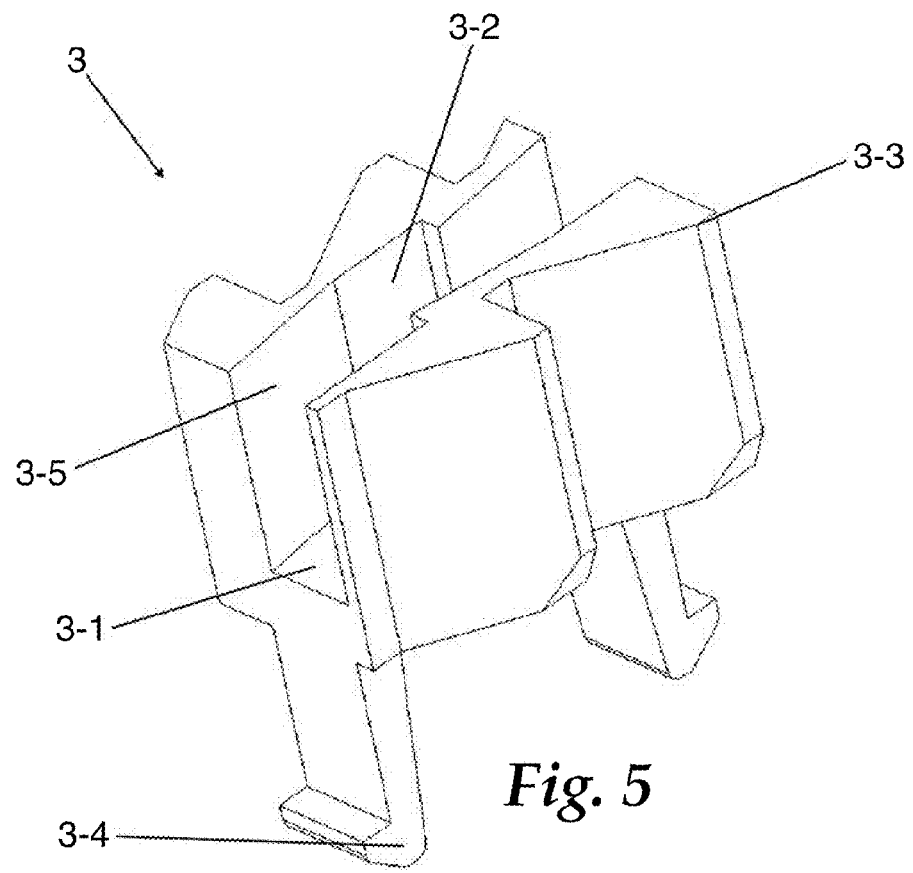
FIG. 5 is a perspective view of a cable adapter.

Further, according to the present invention, the bottom wall 11 of the communication socket is provided with some other structures for arranging or securing fibers as follows. For example, a plurality of curved annular wall portions 40 are provided around the cable entry 19 to create an annular channel between the annular wall portions 40. The annular channel accommodates the optical fiber in the communication socket without violating it minimum bend requirements. Near the knock-off holes 16, 16-1 and 16-2 on the sidewalls, the communication socket comprises a plurality of slots 32, that is the space between strain relief ribs 321, for containing fibers integrally formed on the bottom wall 11. The plurality of ribs 321 are provided on the each side of the slots 32 to allow entering cable gripping and strain relief. As shown in the FIG. 4, the ribs have a fin or barbed shape, which can bite into jackets of the cable. Alternatively, when a smaller diameter cable is used, the communication socket may be provided with a cable adapter 3, as shown in FIG. 5. The cable adapter 3 comprises a base 3-1 and at least one sidewall 3-2 extending from a topside of the base 3-1, wherein the at least one sidewall 3-1 includes protrusions 3-3 having a complementary shape with respect to the securing ribs 321. The adapter 3 may further includes at least one hook 3-4 extending away from the bottom side of the base 3-1 for fixing the cable adapter 3 to the communication socket 100 by engaging with opening 322 in the slot 32. In an alternative embodiment, the fiber adapter 3 comprises two sidewalls 3-2 extending from a topside of the base forming a trough 3-5 between the sidewalls 3-2. The interior surface of the trough 3-5 is extended with strain relief ribs for biting into the jackets of the fiber cable.

Figure 6:
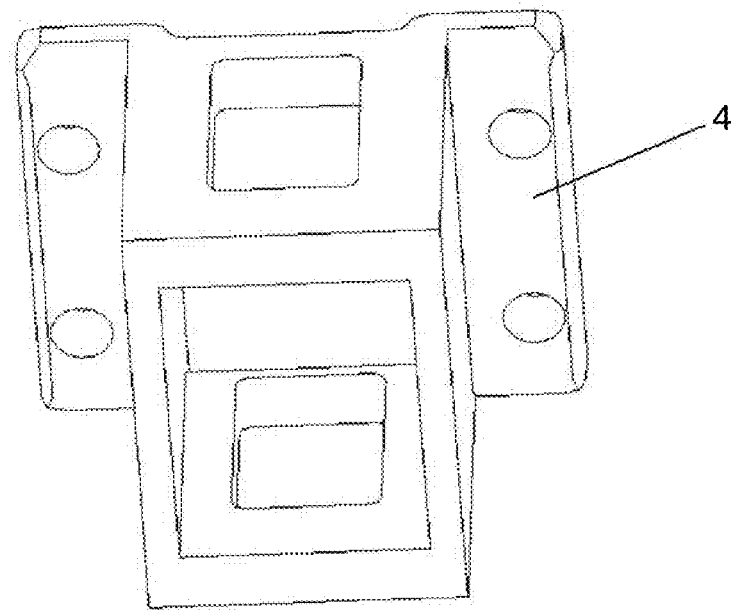
FIG. 6 is a perspective view of a connector adapter.

Further, the communication socket in the embodiment comprises a connector adapter 4. Referring to FIG. 6, different connectors can be installed in the fiber socket mounting portion 13 and the electrical socket mounting portion 14 by means of the connector adapter 4. For example this adaptor 4 allows installing dual LC fiber connector, but could suit to install any kind of connector having small dimensions smaller.

Furthermore, there may be a plurality of mounting holes 18 provided through the bottom wall of the base. Referring to FIG. 4, the housing has at least two mounting directions with adjustable position, so that the openings in the connector sockets can face downward which may ensure safer operation of the communication socket and may be suitable with any kind of installation conditions. Further, an instruction label 6 may be included on the top of cover 2 indicating for the socket contained within the communication socket. An additional protective label 7 may be applied over top of label 6 to prevent label 6 from falling off.

Besides the above embodiment, the invention may have other modifications. For example, the number of the fiber socket mounting portions 13 and the electrical socket mounting portions 14 can be set according to the practice for a specific application, i.e. the mounting portions can be interchanged, like for dual connector configurations or to allow for different intermatability standards. For example, in another embodiment according to the present invention, the communication socket may have one fiber socket mounting portion 13 and one electrical socket mounting portion 14, wherein the fiber socket mounting portion 13 can mount two fiber connectors 8 or adapters 4 in the vertical direction with respect to the bottom wall 11, and has a spacer for keeping the connector at a distance away from the bottom wall 11.

The embodiments in the specification are exemplary, the scope of the invention is not limited to these embodiments. Those skilled in the art can modify or change the invention within the scope of the invention, which falls in the scope of protection of the present application.

What is claimed is:

1. A communication socket, comprising a housing including a base portion having a bottom wall and a plurality of sidewalls, and a cover portion, the base portion, the cover portion being detachably engaged with each other, and at least one bracket extending from the bottom wall, wherein the bracket includes at least two fiber holders at the different heights with respect to the bottom wall;
   wherein the base portion includes a plurality of knock-off holes for inserting an optical fiber at different positions in the sidewall and/or a plurality of fiber entries for inserting a fiber through the bottom wall;
   wherein a fiber connector mounting portion extends from the base; and
   wherein each of the fiber connector mounting portion includes a spacer for maintaining a fiber connector at a distance away from the bottom wall, and a space for inserting the fiber between the fiber connector and the bottom wall.

2. The communication socket according to claim 1, wherein mounting height of the fiber-connector-mounting portion in a vertical direction perpendicular to the bottom wall is larger or equal to twice the height of the fiber connector.

3. The communication socket according to claim 2, the fiber socket mounting portion including two fiber connectors.

4. The communication socket according to claim 1, the fiber connector mounting portion extends from the base integrally.

5. The communication socket according to claim 1, at least one bracket extending from the bottom wall integrally.

6. The communication socket according to claim 1, wherein the position of the knock-off holes corresponding with the space between the fiber connector and the bottom wall.

7. The communication socket according to claim 1, further comprising an electrical connector mounting portion, and at least one cable entry in the center of the bottom wall and/or at least one knock-off hole in the sidewall for inserting an electrical cable into the communication socket.

8. The communication socket according to claim 7, further comprising a spacer for maintaining the cable connector at a distance away from the bottom wall.

9. The communication socket according to claim 1, the electrical connector mounting portion includes an electrical connector.

10. The communication socket according to claim 1, further comprising a plurality of parallel annular wall portions extending from the bottom wall, wherein the annular wall portions define an annular channel between the wall portions.

11. The communication socket according to claim 1, further comprising slots for containing the fiber are provided on the bottom wall at the positions close to the knock-off holes wherein a plurality of securing ribs are provided on sides of the slots.

12. The communication socket according to claim 11, further comprising a cable adapter disposed in the slot for containing the cable.

13. The communication socket according to claim 1, the fiber entries in the bottom wall are inclined and curved in the direction in which the fiber is inserted.

14. The communication socket according to claim 1, the fiber entries have securing portions for securing fiber.

15. The communication socket according to claim 1, wherein the fiber-connector-mounting portion comprises a pair of posts with grooves facing to each other.

* * * * *